United States Patent [19]

Zackrisson

[11] 4,377,312

[45] Mar. 22, 1983

[54] BEARING SEAL

[75] Inventor: Barry L. Zackrisson, Toledo, Ohio

[73] Assignee: Dana Corporation, Toledo, Ohio

[21] Appl. No.: 241,320

[22] Filed: Mar. 6, 1981

[51] Int. Cl.$^3$ .................... F16C 33/78; F16D 3/26
[52] U.S. Cl. .................................. 308/187.1; 464/131
[58] Field of Search ................ 308/187.1, 187.2, 36.1, 308/36.2; 464/131, 133, 11; 277/189, 205

[56] References Cited

U.S. PATENT DOCUMENTS

| | | | |
|---|---|---|---|
| 1,492,351 | 4/1924 | Burns | 64/17 |
| 1,577,268 | 3/1926 | Tarbox | 64/17 |
| 1,685,509 | 9/1928 | Thiemer | 64/17 |
| 1,746,325 | 2/1930 | Thomas | 64/17 |
| 1,943,814 | 1/1934 | Cutting | 64/17 |
| 2,896,433 | 7/1959 | Hempel | 64/17 |
| 3,138,942 | 6/1964 | Kayser | 64/17 |
| 3,178,907 | 4/1965 | Lyons | 64/17 |
| 3,204,428 | 9/1965 | Stokely | 64/17 |
| 3,439,965 | 4/1969 | Kleinschmidt | 308/212 |
| 3,788,100 | 1/1974 | Pitner | 308/187.1 |
| 4,154,490 | 5/1979 | Köhler et al. | 308/187.2 |

FOREIGN PATENT DOCUMENTS 828232  2/1960  United Kingdom .

Primary Examiner—Stuart S. Levy
Assistant Examiner—Scott J. Haugland
Attorney, Agent, or Firm—Frank B. McDonald

[57] ABSTRACT

A bearing race seal for universal joints has an improved coating member which retards intrusion of contaminants, and thus resists corrosion and early failure. The seal includes a metallic backbone with a substantially U-shaped cross-section, and further includes an elastomeric coating member bonded to portions of the backbone. A preferred embodiment of the coating member includes an integral external sealing lip disposed for engagement with a trunnion or similar cross member of a universal joint, and an external body portion disposed for engagement with a journal yoke member.

5 Claims, 2 Drawing Figures

BEARING SEAL

BACKGROUND

This invention relates to universal joints of the type in which two rotary members are connected by furcations pivotally connected in transverse planes to the trunnions of a journal cross member. Generally, the furcations of the members are provided with radially extending aligned openings in which the trunnions of the journal cross member are positioned. Interposed between the trunnions and the furcations are cup-shaped bearing races, the peripheries of which engage the furcations. Each race contains an annulus of needle bearings interposed between the inner periphery thereof and its associated trunnion, so that substantially frictionless movement may take place between the trunnion and the bearing race.

More particularly, this invention is directed to sealing means for the opening between the end of each bearing race and trunnion so that lubricant is retained within the bearing race, and dirt and foreign matter is excluded from same.

Prior art means for sealing the junction of bearing race and trunnion have taken many forms. The earliest constructions were merely metallic elements which fixedly engaged either the trunnion or the bearing race and slidingly engaged the other. However, due to accumulation of tolerances, and as a result of wear, such a seal did not always make adequate contact with the race or trunnion member so that a less than satisfactory result was obtained. Later developments in the art included a resilient element formed to engage the trunnion and also to engage the radially inner end of the bearing race. This type of seal, however, did not perform satisfactorily because the resilient sealing means soon became brittle and deteriorated after wear and exposure to elements of contamination.

Later developments in the art evolved a resilient sealing member for engaging either one of or both the trunnion and the bearing race, and included a metallic portion which overlayed the resilient member to compress same between the bearing race and trunnion. However, the majority of these seals only engaged the bearing race on the radially inner end thereof, so that an unsatisfactory sealing condition continued to persist.

In still later prior art seals, the resilient portion of the seal was adapted to engage both the inner and outer peripheries of the bearing race in addition to the metallic portion of the seal engaging the trunnion of the journal cross. Such construction resulted in a better sealing relationship; however, several problems were still prevalent. For example, the metallic portion of the seal did not properly secure the engagement of the resilient material with both the inner and outer peripheries of the race. Additionally, as the seal projected within the bearing race, there was a tendency for the annulus of needle bearings contained therein to abut the resilient material, and to therefore be subjected to objectionable frictional drag. This required the addition of a separate metallic element disposed interjacent the resilient material of the seal and needle bearings to reduce the latter drag.

Although much effort has been directed toward the enhancement of universal joint bearing seals, particularly as to the quality of internal sealing means relative to the bearing race, there remained a need for greater external protection from contaminating elements. Thus, an improved external sealing means was desired for the protection of the universal joint portions in direct contact with dirt, moisture, and other elements of contamination.

SUMMARY

The bearing race seal of this invention combines the internal sealing benefits of prior art with a new protection for universal joint portions which are external to the bearing race. Thus, the sealing means of this invention incorporates an improved protection against the ingress of contaminants between the external seal body wall and trunnion interface, and between the latter wall and journal yoke interface. In a preferred embodiment, the seal incorporates an annular metallic backbone having a generally U-shaped cross section. An elastomeric coating member is bonded to both internal and external portions of the backbone, the elastomeric member including an integral external sealing lip disposed for engagement with the trunnion of a journal cross member, and an external body portion disposed for engagement with a journal yoke member.

DETAILED DESCRIPTION OF PREFERRED EMBODIMENTS

Figure 1:
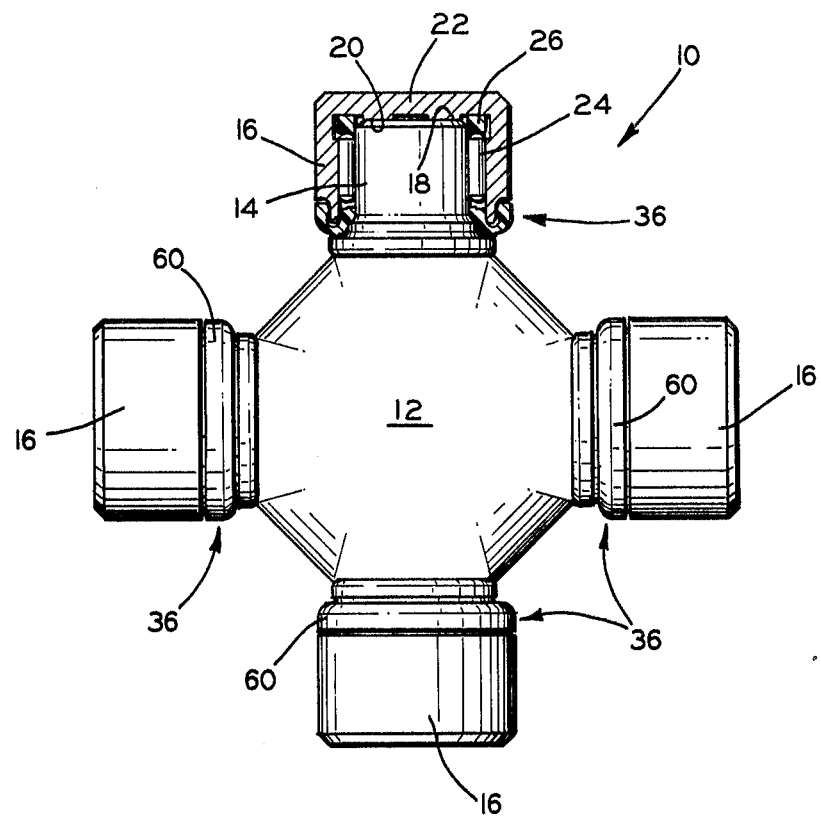
FIG. 1 is a view partially in section of the seal of this invention as used in conjunction with a journal cross having four trunnions with bearing races mounted on the trunnions.

Referring to FIG. 1 a journal cross shown generally at 10 includes a central body portion 12 having four trunnions 14 extending therefrom in a circumferentially equally spaced relationship. Disposed on each trunnion is a cup-shaped bearing race 16 which is adapted to be secured in a suitable manner to a furcation of a universal joint member (not shown).

A radially outer end 18 of the trunnion 14 and a radially inner surface 20 of the closed end 22 of the bearing race 16 slidingly engage each other in a thrusting relationship. The outer periphery of the trunnion 14 and the inner periphery of the bearing race 16 are spaced from each other, and disposed therebetween is an annulus of needle bearings 24 adapted to rollingly engage the bearing race 16 and trunnion 14. Between the radially outer end of the needle bearings 24 and the inner surface 20 is an annular spacer member 26 made from "Nylon", "Delrin" or the like to provide low frictional engagement of the radially outer ends of the needle bearings.

Figure 2:
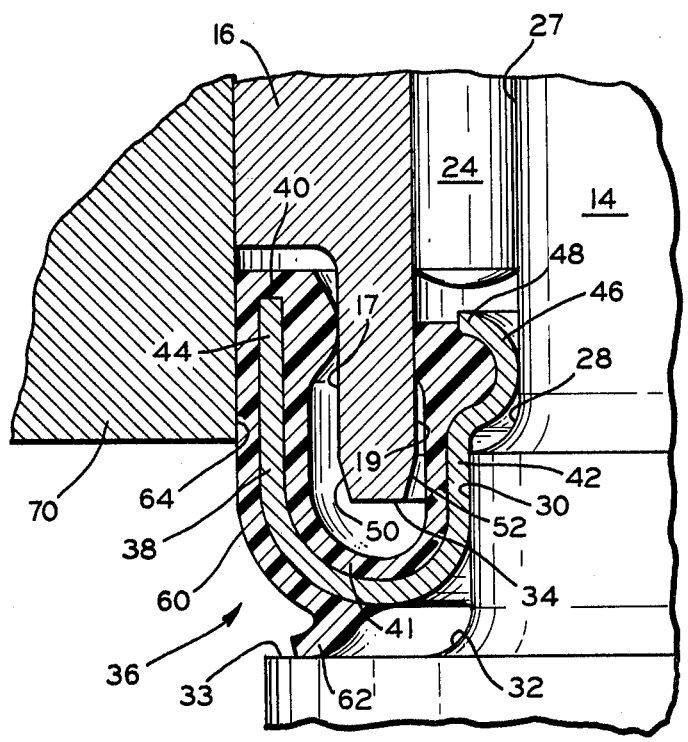
FIG. 2 is a sectional view of a portion of the area at the open end of one of the bearing races including the portions of trunnion and journal yoke members disposed adjacent thereto and includes the sealing means of this invention in engagement with said portions.

Referring to FIG. 2, the trunnions 14 are provided with a first radius 28 which lies at the junction of a needle bearing engaging portion 27 of trunnion 14 and a seal engaging portion 30 thereof, and a second radius 32 lying at the junction of the latter portion and an annular shoulder 33 at the base of the trunnion, adjacent the body portion 12 of the journal cross 10. Preferably, the radially inner end 34 of the bearing race 16 overlies the seal engaging portion 30 by at least a small amount, as shown.

Sealing means, shown generally at 36, operatively seals the opening which exists between the open end of the bearing race 16 and the trunnion 14. The sealing means 36 includes an annular metallic backbone 38 and an annular resilient elastomeric member 40 which are bonded together to form a unitary structure. The metallic backbone 38 is generally U-shaped in cross-section and directly engages the seal engaging portion 30 of the trunnion 14 while being spaced from the radius 32. The spacing from the radius 32 is provided to insure a satisfactory engagement of an external sealing lip 62 with the annular shoulder 33 of the trunnion 14, more fully explained below. In assembly of the seal 36 on the trunnion 14, it is desirable that an interference fit exist between the metallic backbone 38 and the seal engaging portion 30 to insure proper sealing.

The U-shaped upper portion of the metallic backbone 38 defines inner and outer lips 42 and 44, respectively. In a preferred embodiment, lips 42 and 44 extend radially beyond the inner end 34 of the bearing race 16, as shown. A portion of the resilient elastomeric member 40 of the sealing means 36 lies on the inner periphery of the metallic backbone 38 and is thus interposed between the lip 44 and the outer periphery 17 of the bearing race 16, and between the lip 42 and the inner periphery 19 of the bearing race 16. A portion 41 of the resilient elastomeric member 40 lying at the radially inward part of the sealing means 36 and not between the lips 42 and 44 and the bearing race 16 may be omitted if desired, but has been shown as part of a continuous structure for manufacturing convenience. Optionally, the lip 42 at its radially outer end has a portion 46 formed concavely with respect to the bearing race 16 so as to allow for a greater volume of elastomeric material to contact the inner periphery 19 than if the lip 42 extended radially along a straight line. Additionally, the extension of the lip 42 a slight distance radially outwardly of the elastomeric member 40 provides a metallic shoulder 48 at the radially outward end of the sealing means 36 within the inner periphery of the bearing race 16. The shoulder 48 engages the radially inward ends of the needle bearings 24 for prevention of the latter from directly engaging the elastomeric member 40, and becoming frictionally retarded in their rotation thereby. As shown, the needle bearings 24 are spaced from the shoulder 48; however, the needle bearings are free to move radially, and at certain stages of operation will actually engage the shoulder 48.

The resilient elastomeric member 40 of the sealing means 36 also extends over the exterior portion or the outer lip 44 of the annular metallic backbone 38. Thus, the elastomeric member 40 includes an exterior wall 60 which provides for a resilient sealing engagement of the sealing means 36 with a journal yoke 70, particularly with the internal wall 64 thereof, as shown. The exterior wall 60 includes an integral external sealing lip 62, annularly disposed thereabout for providing a sealing engagement with the shoulder 33 of the trunnion 14. The wall 60 and lip 62 together define an external sealing means which complements and greatly enhances the previously described internal bearing race sealing means of the prior art as incorporated herein.

The thickness of the resilient elastomeric member 40 of the sealing means 36 is preferably sized to insure that the elastomeric member 40 will be compressed between the bearing race 16 and the metallic backbone 38 to insure a satisfactory seal therebetween. This sizing concept applies as well to the thickness of the exterior wall 60 of the elastomeric member 40, with respect to its engagement of the internal wall 64 of the journal yoke 70.

It is readily apparent that the above defined construction provides a labyrinth seal system between bearing race, trunnion, and yoke members of a universal joint for protection of lubricant contained within the bearing races thereof. The resilient elastomeric member 40 thus defines combined internal and external sealing mediums, resulting in an overall superior seal to those of the prior art.

What is claimed is:

1. In a bearing race seal disposed for use in the interface of trunnion and journal yoke members of a universal joint, said seal including an annular metallic backbone having a generally U-shaped cross section, said backbone disposed for engagement of said seal with inner and outer peripheries of a bearing race, said seal further including an elastomeric coating member bonded to portions of said backbone; an improvement comprising an external sealing lip integral with said elastomeric coating member and disposed for engagement with a trunnion, said improvement further comprising an external wall portion integral with said elastomeric coating member and disposed for engagement with a journal yoke member to define a labyrinth seal including at least one sealing engagement between each of:

(a) said backbone and said yoke member,
   (b) said backbone and said outer periphery of said race,
   (c) said backbone and said inner periphery of said race, and
   (d) said backbone and said trunnion.

2. The bearing race seal of claim 1 wherein said U-shaped cross section defines a concentric pair of spaced lip portions, the first of said lip portions disposed for being positioned internally of a bearing race member, the second, externally of a bearing race member, whereby said elastomeric coating member is disposed on said lip portions for sealingly engaging internal and external peripheries of a bearing race.

3. The bearing race seal of claim 2 wherein one of said lip portions includes an exposed portion of said metallic backbone, said portion defining a bearing surface for ends of needle bearings disposed within said race.

4. The bearing race seal of claim 3 wherein said integral external sealing lip of said elastomeric coating member defines a resilient annular ring disposed for engagement with an annular shoulder of said trunnion.

5. The bearing race seal of claim 4 wherein said external wall portion of said elastomeric coating member is disposed for engagement with the internal wall of a journal yoke member.

* * * * *